United States Patent [19]
Boyd

[11] Patent Number: 4,567,479
[45] Date of Patent: Jan. 28, 1986

[54] DIRECTIONAL CONTROLLER APPARATUS FOR A VIDEO OR COMPUTER INPUT

[76] Inventor: Barry S. Boyd, 4649 N. 23rd St., Arlington, Va. 22207

[21] Appl. No.: 452,687

[22] Filed: Dec. 23, 1982

[51] Int. Cl.$^4$ .............................................. G09G 3/02
[52] U.S. Cl. ................................ 340/709; 340/825.19; 200/6 A
[58] Field of Search .................. 273/148 B; 200/6 A; 340/709, 825.19; 128/782

[56] References Cited

U.S. PATENT DOCUMENTS

| | | | |
|---|---|---|---|
| 3,229,059 | 1/1966 | Beatty | 273/148 B |
| 4,293,855 | 10/1981 | Perkins | 340/825.19 |
| 4,298,863 | 11/1981 | Natitus et al. | 340/825.19 |
| 4,425,488 | 1/1984 | Moskin et al. | 200/6 A |
| 4,445,011 | 4/1984 | Hansen | 200/6 A |

OTHER PUBLICATIONS

R. P. Sapp, Patient Breath Pulse Control System for Operating Various Electrical Devices, Apr. 1979, Western Electric Technical Digest, No. 54.

Primary Examiner—John W. Caldwell, Sr.
Assistant Examiner—Jeffery A. Brier
Attorney, Agent, or Firm—Edwin E. Greigg

[57] ABSTRACT

A cranial controller for supplying directional signals to a computer input is provided in which the controller is affixed to the head of an incapacitated user and by selectively moving his or her head one of several mercury switches is activated to send a directional control signal corresponding to the selected cranial movement to a computer console or video device. In addition, the user's mouth provides a pressure source for activating a vacuum controlled switch in the controller for providing a function signal to the computer input.

1 Claim, 6 Drawing Figures

DIRECTIONAL CONTROLLER APPARATUS FOR A VIDEO OR COMPUTER INPUT

BACKGROUND OF THE INVENTION

The invention relates to the field of electrical switching input devices and particularly to such devices applied to the control of video displays such as video designs involving word or symbol displays. Such control switching input devices are normally manually controlled to effect an up-down or left-right shift of words or symbols on the display screen of a video device. Such conventional controls, however, are outside the needs of handicapped persons who wish to partake in the control operation of a video device, such as a programmed video game or word display used with such a device. A need, therefore, exists to allow handicapped persons, for example those without use of their hands, quadraplegics, for example, to participate in the control and operation of video display devices and to use these devices in the same manner as the non-handicapped person would do. At present there are available in the prior art a number of known switching mechanisms for controlling a signal such as a light by means of a switch or switches responsive to motion or a change in position with respect to a given frame of reference. For example, U.S. Pat. No. 2,903,820 discloses a ball having a light positioned at different locations within it, and separate mercury switches are positioned relative to each other within the ball so that different lights are controlled by the different switches depending upon the position of the ball.

OBJECT AND SUMMARY OF THE INVENTION

It is a principal object of the invention to provide a directionally controlled switching device for use by handicapped persons in order to interface with video display systems, micro-computers, video game consoles and the like. It is another object of the invention to provide a directionally controlled switching mechanism to be used by manually incapacitated persons that can be activated by movement of the head together with suction through the mouth. It is yet another object of the invention to provide a cranially operated switching control that can be used for electronically controlling any system that is manually operable under conventional conditions such as typewriters and print-out devices, electronic appliances, mechanical limbs and wheelchairs. It is still a further object of the invention to provide a directionally responsive switching mechanism which can be adjusted for the user with respect to a given frame of reference regardless of what position the user's head and body assumes. For example, a quadraplegic or otherwise incapacitated person in a supine position can operate the device as effectively as a person in a sitting or reclining position. These and other objects are attained according to the invention by providing a directional controller comprising an array of mercury switches arranged in a specific manner on an adjustably positioned support which can be affixed to the head of the operator by means of a suitable elastic headband, such that the operator can tilt his head in a number of different directions to effect a corresponding number of control signals to the device being controlled by the controller. By means of a conventional computer input jack the device according to the invention interfaces with a computer, video console or other electronic device adapted to receive multiple input signals.

The invention will be better understood as well as further objects and advantages thereof become more apparent from the ensuing detailed description of a preferred exemplary embodiment take in conjunction with the drawings.

DESCRIPTION OF THE PREFERRED EMBODIMENTS

Figure 1:
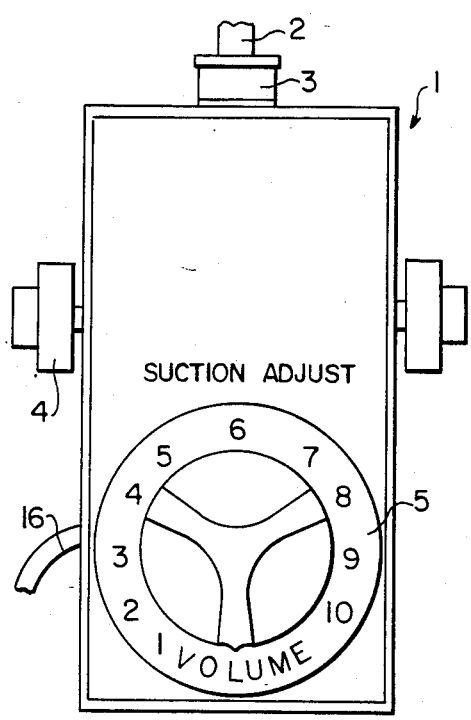
FIG. 1 is a front plan view of the directional controller according to the invention.

Turning now to FIG. 1, there is shown the directional controller 1 in the form of suitable plastic housing having a cable 2 and jack connection 3 affixed to the top side. On either side of the housing 1 are shown two adjusting knobs 4 for positioning the switch support to be described below. A suitable mark on one or both of the knobs indicates the position of the interior switch support. Atop the front of the housing 1 there is positioned a suction force adjust dial 5 for varying the suction force necessary to operate the interior function switch to be more fully described below.

Figure 2:
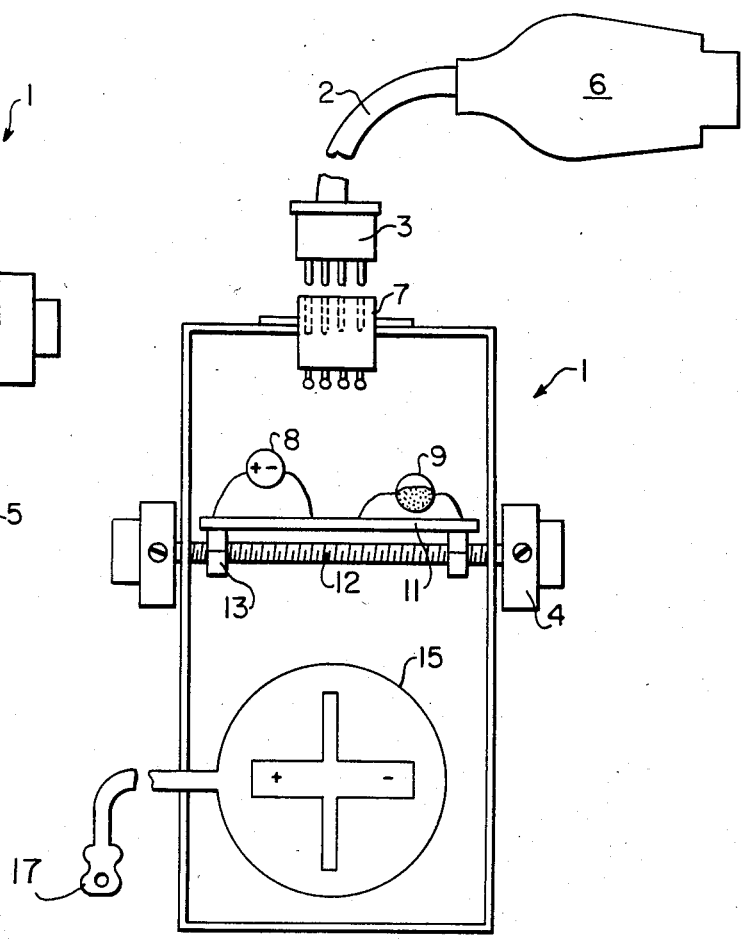
FIG. 2 is a schematic view of the interior of the device shown in FIG. 1.

FIG. 2 shows the interior of the housing 1 in which the jack 3 is seen to be connected to a female counterpart jack 7. The cable 2 in turn connects with a conventional computer jack which can plug into a conventional computer console or video device. Two mercury switches 8 and 9 are seen to be mounted on a support plate 11 by means of mastic mounds 10 disposed at respective ends of each of the mercury switches so that one end of each switch is higher than the other end with respect to the horizontal. The plate 11 is affixed by suitable lugs 13 to an axial member 12 which in turn connects the knobs 4. Thus, by turning either of the knobs 4 the position of the support 11 is changed. Also, fixed within the housing 1 is a vacuum-operated switch 15 of conventional design which is connected by means of a tube member 16 to a mouthpiece 17. The switch 15 is opened or closed by either suction through the tube 16 or by increased air pressure from the user's mouth.

Figure 3:
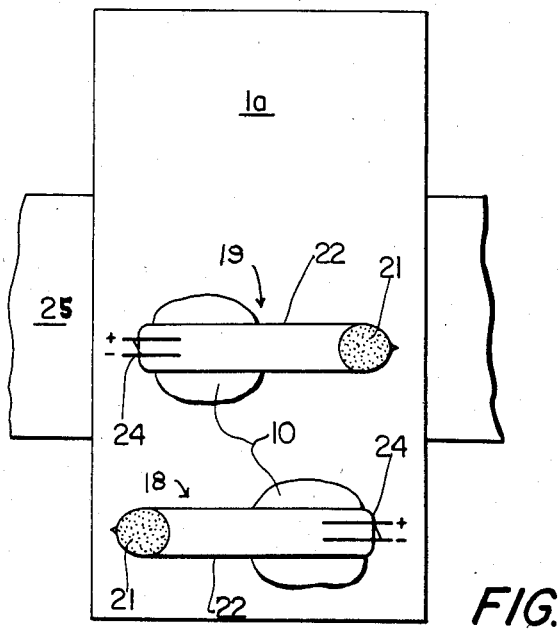
FIG. 3 is a plan view of the underside of the lid for the device shown in FIGS. 1 and 2.

FIG. 3 shows the other two mercury switches 18 and 19 secured by means of the mastic 10 to the underside of the back of the housing 1. Switches 18 and 19 are positioned at right angles to the longitudinal direction of switches 8 and 9 and, similar to the latter switches, each switch is sloped so that the mercury globule occupies the contact-less end of the tube when the housing is in a level position. The mercury globule 21 is seen to occupy the one end of the glass tube 22 remote from the contacts 24. The same principle holds for the switches 8 and 9. Also shown attached to the housing 1 is a suitable elastic headband 25 which when worn on the head places the controller on the forehead of the user with the vacuum control dial facing away from the head. The controller, however, need not be worn on the forehead but could be placed on the side of the head, or some other suitable position on the head in which the switches could be leveled for operation by cranial movement.

Figure 4:
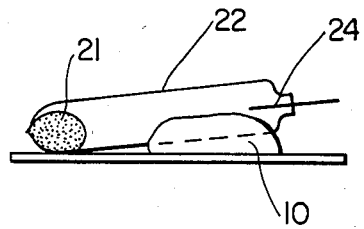
FIG. 4 is a side view showing the arrangement of the switches for FIG. 3.

In FIG. 4 it is seen how the mercury switch is shown supported on the underside of the back of the housing 1 so that the mastic support 10 effects to raise one end of the switch above the other end, as shown, thus causing the mercury globule 21 to occupy the contact-less end of the tube 22 when the controller device is in a substantially horizontal position, that is, when the user is in a supine position.

Figure 5:
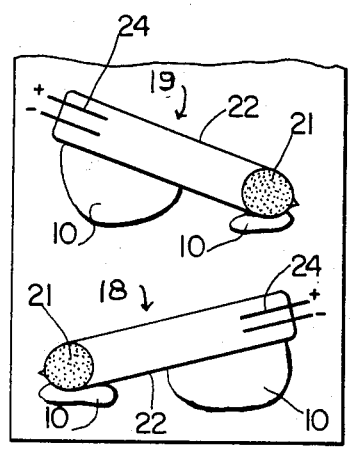
FIG. 5 is a plan view of an alternative arrangement to that shown in FIG. 3.

In FIG. 5 an alternative arrangement is shown in which the mercury switches are not parallel as shown in FIG. 3 but are oblique to each other so that the mercury globules 21 occupy their respective contact-less ends of the tubes 22 when the controller device is in a level position in which the user is in a reclining or sitting-up position. It is also within the scope of the invention to have the switches shown in FIG. 5 not only oblique to each other as shown but also angled with respect to the back of the housing 1, such as shown in FIG. 4, so that the switches 18 and 19 are angled in two separate planes normal to each other. In this arrangement the user can operate the controller in either the supine position or the sitting up position.

Figure 6:
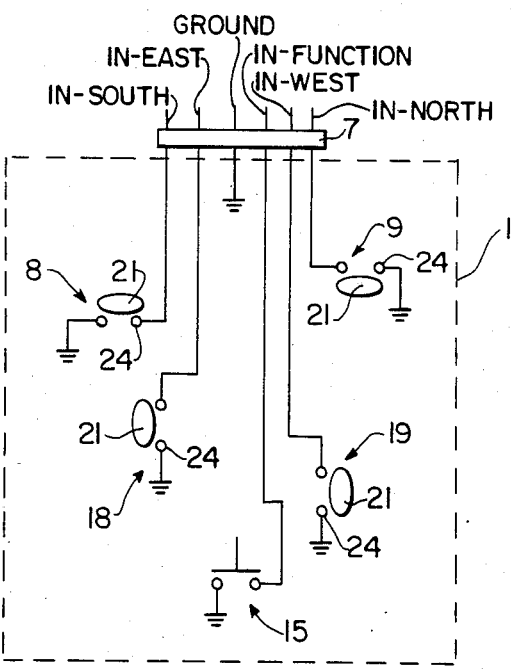
FIG. 6 is a simplified circuit diagram of the arrangement of the switches according to the invention.

FIG. 6 illustrates the arrangement of the wiring of the switches 8, 9, 15, 18 and 19 with respect to each other in the housing and shows the wiring terminating in the six-prong jack 7. As mentioned earlier and shown in FIG. 6, the switches 8 and 9 are virtually parallel with one another and extend generally in the same horizontal plane, whereas the switches 18 and 19 are also virtually parallel with one another and extend generally in a plane at right angles to the plane containing switches 8 and 9.

When placed on the forehead by means of the headband 25, the device operates in the following manner. By sucking from or breathing into the mouthpiece 17 the vacuum switch is activated to signal an appropriate function to a suitable electronic system which receives the input jack 6 at an appropriate receptacle in a video device which is to be controlled by extraneous directional signals, for example, from a conventional "joystick" device. According to the invention the handicapped user may communicate a north or forward signal to the video device by tilting his or her head forward so that the mercury switch 9 is thereby activated. If the user tilts his head backward, he activates the switch 8 and thus communicates a south or backward signal. By tilting his head to the right, the user activates the switch 18 and thus communicates an east or right signal. Tilting the head to the left conversely activates switch 19 and thus communicates a west or left signal.

Once the controller is in position on the forehead, the knobs 4 can be rotated to level the switches 8 and 9 so that any forward or backward movement from the horizontal will activate them respectively. If the patient or handicapped user is in a supine position the switches 18 and 19 are positioned on the underside of the lid 1a as shown in FIGS. 3 and 4 so that the tubes are parallel with one another but not in the same plane, that is, the mastic is positioned under opposing ends of the respective tubes as is the case for switches 8 and 9. If the patient wishes to assume a sitting or reclining position, then the switches 18 and 19 are positioned as shown in FIG. 5. For this purpose an auxiliary back supporting the switches as shown can be substituted for the back shown on FIG. 3 once the switches are disconnected.

While the invention has been described using four switches, it is also contemplated that a larger number of switches, six or eight for example, could be used in conjunction with a greater number of head movements than the basic four described above. Also more than one suction switch 15 can be provided for increasing the logic imput capacity by double. For example, if one suction switch provides a logic capacity of 8 bits of information for your switches, then another suction switch would provide a 16 bit information imput and that figure in turn would be doubled by the addition of yet another function switch, such as shown at 15.

The foregoing relates to preferred exemplary embodiments of the invention, it being understood that other embodiments and variants thereof are possible within the spirt and scope of the invention, the latter being defined by the appended claims.

What is claimed and desired to be secured by Letters Patent of the United States is:

1. A cranially supported computer input device for use with a computer, comprising a switch control housing having a first set of position-responsive switches and a second set of position-responsive switches arranged relative to said first set of position responsive switches, a vacuum-pressure-operated switch in said housing, means in said housing for adjusting a position of one set of said sets of switches to a horizontal position, cranial support means for cranially supporting said housing, and circuit means connecting said sets of switches and said vacuum-pressure-operated switch to said computer, whereby different functions of said computer are controlled by the position of said switches and the state of said vacuum-pressure-operated switch.

* * * * *